Patented May 23, 1933

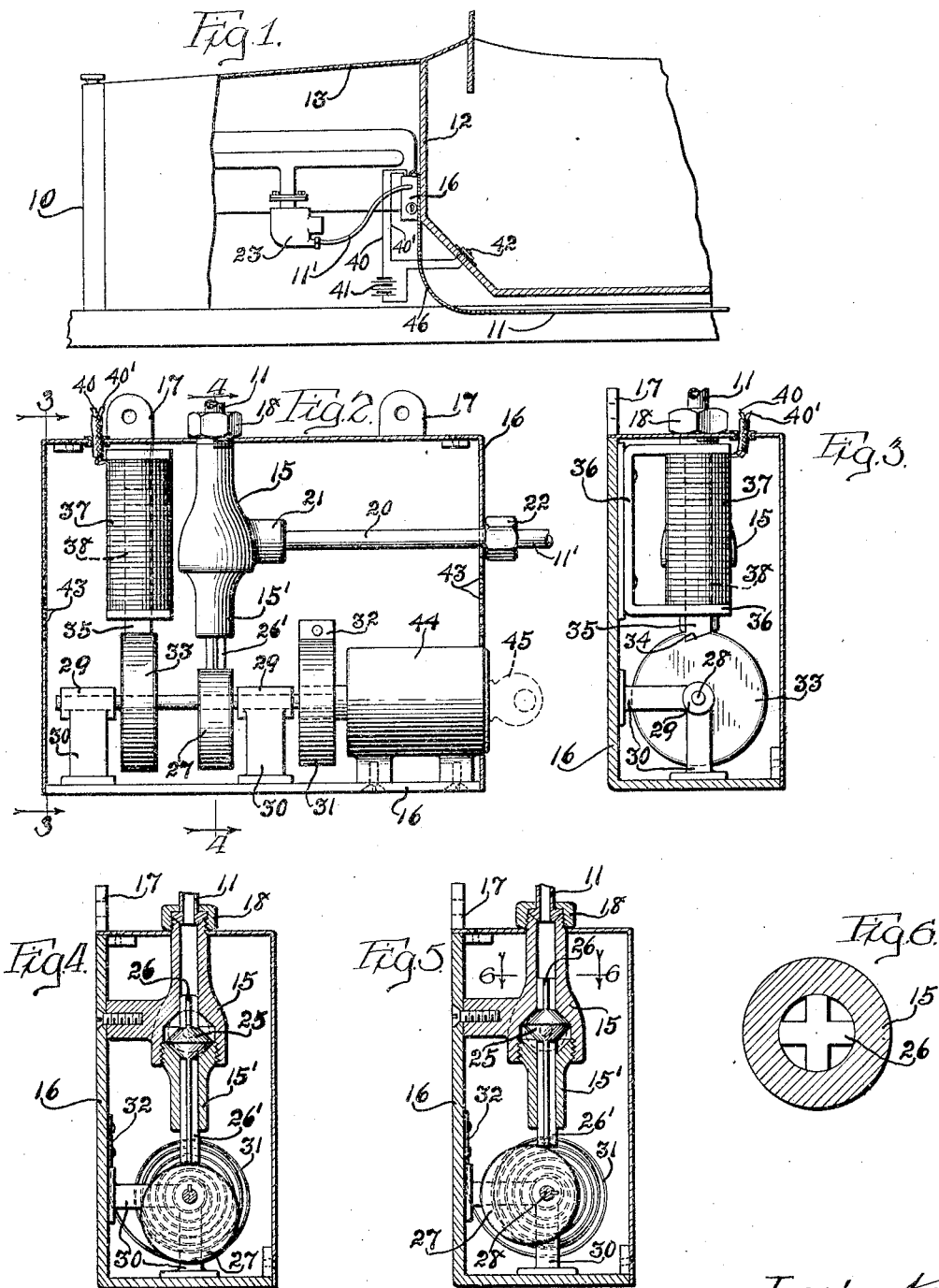
May 23, 1933. C. W. RICHTER 1,910,499
VALVE LOCKING DEVICE
Filed May 16, 1931
Inventor:
Charles W. Richter
By J. Daniel Stuwe
Atty.

1,910,499

UNITED STATES PATENT OFFICE

CHARLES W. RICHTER, OF CHICAGO, ILLINOIS

VALVE LOCKING DEVICE

Application filed May 16, 1931. Serial No. 537,979.

This invention relates to a valve locking device, and more particularly, a device for shutting off the fuel supply in the supply pipe of a motor vehicle or the like.

One of the main objects of this invention is to provide a device which may be readily set in action for automatically closing and locking the supply pipe in a motor vehicle, so as to prevent thieves from getting away with the vehicle.

Another object is to interpose this locking device in the fuel supply line, so that the fluid in part of the line will still be free to flow to the carburetor after the device has been set or locked, in order that a driver who has been expelled may get a safe distance away for summoning help, before the automobile stops and the thieves discover their aim is thwarted.

A further object is to provide a valve locking device which is supplied as a unit, so that it may be conveniently interposed in the fuel supply pipe of an automobile and may be readily mounted on the body thereof, in such a manner as to be conveniently and quickly actuated or rendered operative by the driver or a person in the vehicle, and unobserved by the thieves.

A still further object is to provide this device with a valve to be interposed in the supply pipe, and which valve along with the means for automatically locking it is protected in a strong casing or housing mounted in a concealed position in the vehicle, to prevent tampering with or releasing of the locking means.

Various other objects and advantages will become apparent from the description, taken in connection with the accompanying drawing, in which the invention is illustrated in its preferred form of construction, it being understood that various other arrangements and forms of construction may be resorted to for carrying out the objects and purposes of this invention.

In the drawing:

Fig. 1 shows my invention applied to a motor vehicle for locking up the fuel supply in the fuel pipe thereof.

Fig. 2 is a vertical sectional view longitudinally through the device.

Fig. 3 is a vertical cross-sectional view, taken on line 3—3 of Fig. 2, showing the means for holding the elements in the valve-open position.

Fig. 4 is a vertical cross-sectional view, taken on line 4—4 of Fig. 2, showing the valve open.

Fig. 5 is a sectional view similar to Fig. 4, but showing the valve closed.

Fig. 6 is an enlarged cross-sectional view, taken on line 6—6 of Fig. 5.

My invention is adapted for closing and locking a fluid pipe to shut off the current of fluid therein, such as gasoline, gas, steam and the like; and for this purpose of illustration, the invention is illustrated in the drawing herein as applied to a motor vehicle 10, for closing and locking the fuel supply line or pipe 11 thereof. The device is preferably mounted in a concealed position, as indicated in Fig. 1, as on the front wall 12 of the vehicle body beneath the hood 13; so that the device will not be observed by parties endeavoring to steal the car.

The drawing illustrates the invention in its preferred form of construction, and as comprising a valve 15 which is interposed in the pipe line 11, and is mounted in a sturdy casing or housing 16, wherein the essential parts and elements of this device are concealed and protected. This housing is provided with suitable means, as for instance, brackets 17, for securing the device in the desired position on the vehicle.

For interposing this valve and the device in the fuel supply pipe 11, coupling means 18 is provided at the top of the valve and is placed at the top of the housing, to connect the valve with the main portion of the supply pipe 11. An extension or auxiliary pipe 20 is extended from an outlet branch 21 on the valve to one end of the housing, and has a coupling element 22 thereon which is connected with a short portion 11' of the fuel line that extends from said housing forwardly to the carburetor 23.

The valve 15 is preferably constructed substantially as shown in Fig. 4 of the drawing, having a lower portion 15' removably mounted in the main upper portion of the valve casing, and having a valve element 25 provided with an upper valve stem 26 and a lower valve stem 26' extending from said element. These stems are cross-shaped in cross-section, so that the fluid can flow between the same and the valve casing, and that they will also function as guides in said casing. The fluid thus descends through pipe 11 and alongside stem 26 in the valve, then out through branch 21 and extension 20, into front portion 11' of the fuel pipe. Said valve element 25 is held normally-open by gravity, and is furthermore forced open by the fluid flowing therethrough.

Means is provided which is concealed in the housing for closing the valve and retaining it closed. This means preferably includes a forcing member or eccentric 27 which engages valve stem 26' and is secured on and turns with a shaft 28 journaled in bearing sleeves 29, which are secured in the housing with bracket arms 30, as shown, or in a suitable manner to provide a sturdy mounting therefor.

The closing means further includes means which is normally held under stress, and which when released will automatically actuate member 27, to force the valve into its closed position; and this means is preferably provided in the form of a spring 31 which has its inner end secured to the shaft 28 and has its outer end secured to the housing, as indicated at 32. The spring will be wound-up or placed under stress when the valve is in its open position, as indicated in Fig. 4 of the drawing, and when released will unfold to automatically turn or actuate shaft 28 and eccentric 27, thereby moving the valve element upwards into the closed position, as indicated in Fig. 5, and positively retaining it in such closed position, until the shaft and spring and eccentric have been returned to their release position.

This closing means, including the spring and the eccentric, is normally held or secured in position to have the valve open, as indicated in Fig. 4, and this is preferably accomplished by using a disk or member 33 which is secured on shaft 28 and is provided with a notch 34 wherein a finger or plunger 35 engages for holding said disk against rotation. This holding finger is slidable in bracket means 36 in the housing.

Means is provided for readily withdrawing this finger or element 35, and this is arranged to be readily and quickly actuated by a party in the motor vehicle, and preferably so that it is not readily observed by persons endeavoring to steal the vehicle. This means is therefor preferably actuated by electricity and includes an electric member 37, which may be in the form of a solenoid mounted in the housing, and it is preferably mounted by the use of said bracket means 36. The holding finger 35 is thus readily made to form an integral part of the core 38 of the solenoid.

For completing and closing the current through the solenoid or electric member 37, conductors 40 and 40' may be provided, to extend from the member 37 to the battery 41 of the automobile, and to a suitable switch 42 which is preferably mounted within convenient reach of the driver's foot, so as to be closed thereby for closing the circuit through the battery and the electric member 37, whereby the holding finger 35 is lifted from notch 34 and disc 33, thus releasing the holding means which normally holds the valve closing means, including the eccentric 27 and the stressed spring 31, in the valve-open position; whereupon said eccentric presses valve stem 26' and valve element 25 upwardly to automatically close the valve and hold it in its closed position.

When the valve is thus closed, the fluid or fuel in pipe portion 11' will still be enabled to flow to the carburetor, to enable the vehicle to run a short distance, as the air enters the housing through the perforated means 43 provided thereon, and then passes up alongside valve stem 26', beneath the closed valve element 25, as indicated in Fig. 5, and then follows this small amount of fuel flowing in pipe portion 11'.

Locking means is also provided whereby the essential movable parts or elements of the device are returned to their release or valve-open position. This means includes a safety lock 44, mounted within the housing, at one end thereof, and in position to be actuated by a key 45 at the end of the housing, substantially as indicated in Fig. 2 of the drawing.

In this invention the elements are arranged and provided to be housed and securely protected within the casing or housing 16, which is therefor made of a sturdy construction, so that the elements cannot be readily reached and tampered with, even if the device is discovered by a thief or any unauthorized person; and the lock is in the form of a safety lock, so that the device cannot be changed into the released position, except by the person having the proper key therefor.

The pipe or conduit 11 is furthermore provided with armor 46 for a portion of its length adjacent housing 16, as indicated in Fig. 1, so that the pipe cannot be readily cut with a knife or the like and separated from the casing and connected to avoid the operation of this locking device, in case that the device should be discovered by the thieves. This will therefor prevent any chance of a quick change in this arrangement, whereby thieves would be enabled to readily make a get-away with the vehicle and the locked device, before the summoned help or police have time to arrive.

I claim as my invention:

1. In a motor vehicle, in combination with the fuel pipe thereof, a device comprising a housing having bracket means whereby it is mounted in a concealed position under the hood of the vehicle, a normally-open valve mounted in said housing, there being means for interposing the valve and housing in said fuel pipe, means for forcing the valve closed including a shaft which has surrounding it and secured thereto a valve closing member and a spring which is stressed while the valve is open, means in said housing including a notched member on said shaft and an electric member having a part to normally engage in the notch and hold said shaft and resilient means in valve-open position, a lock on said shaft within said housing whereby to rotate said shaft and return the various housed elements to the valve-opened position, and electric means including a touch button readily operable by a person in the vehicle to actuate said electric member and release said holding part, whereupon said resilient means automatically closes said valve and retains it closed.

2. A fuel pipe locking device comprising a housing having bracket means for mounting it concealed under the hood of a motor vehicle, a normally opened valve including tubular inlet and outlet means thereon mounted within said housing and provided with tubular connecting means for interposing the valve and housing within the fuel pipe, an operating shaft journalled in said housing, an eccentric secured around said shaft to engage the valve stem for closing the valve, spring means surrounding said shaft and secured thereon, being held under stress while the valve is open, a notched disk member secured on said shaft, a solenoid in the housing having a holding finger on its plunger for engaging in the notch to normally hold said shaft and valve in the open position, a lock on said shaft within said housing whereby to rotate said shaft and notched member and eccentric and return the various elements to the valve open position, and electric means including a touch button readily operable by the foot of a person in the vehicle for actuating said solenoid and withdrawing said finger from the notch in the member, whereupon said resilient member automatically rotates said valve closing member and retains it closed.

In testimony whereof I have signed this specification.

CHARLES W. RICHTER.